July 26, 1932.  F. H. KROGER  1,868,982
DIRECTION FINDER
Filed April 29, 1927  2 Sheets-Sheet 2

INVENTOR
F. H. KROGER
BY Ira J. Adams
ATTORNEY

Patented July 26, 1932

1,868,982

UNITED STATES PATENT OFFICE

FRED HUTTON KROGER, OF BROOKLYN, NEW YORK, ASSIGNOR TO RADIO CORPORATION OF AMERICA, A CORPORATION OF DELAWARE

DIRECTION FINDER

Application filed April 29, 1927. Serial No. 187,553.

My invention provides an improved direction finder, an important use of which is as a radio direction finder for ships, aeroplanes, land vehicles, etc.

In the use of a radio direction finder or radio compass on shipboard or elsewhere, the direction finder loop, which is preferably arranged vertically, is rotated to determine a vertical plane in which the sending station lies. This operation is generally described as determination of "line of bearing" of the sending station with respect to the direction finder. Determination of line of bearing does not show on which side of the direction finder the sending station is located; that is, if line of bearing is found to be in a north and south plane, its determination does not show whether the sending station lies to the north or to the south. The ascertainment, in a case such as is above assumed, whether the sending station lies to the north or to the south is generally referred to as determination of "sense of direction."

In the use of direction finders employing a loop, the line of bearing of a transmitting station can be approximately determined either by use of maximum signal or of minimum signal or null point. Where maximum signal is used and the loop is arranged in a single vertical plane, the loop at the point of maximum signal will lie in a vertical plane passing through the sending station, whereas when minimum signal or null point is employed the loop at the point of minimum or no signal will lie in a plane at right angles to the direction of the sending station from the receiving loop. Since the point of minimum or no signal, that is, the null point, is capable of being determined with greater accuracy than the point of maximum signal, determination of line of bearing by minimum signal or null point generally gives better results than determination by maximum signal, and hence is generally employed.

In the use of direction finders aboard ships where there are structures in the vicinity of the direction finder loop, such as masts, stacks, elevated wires, etc. which can act as grounded vertical antennæ, the null point of the signal received from a transmitting station, the line of bearing of which is desired to be ascertained, is often not as sharply-defined as that which is obtained when the direction finding apparatus is located in open country. These grounded structures are found to produce, due to the current in them resulting from incoming signals, an electromotive force in the direction finder loop, which is vectorially 90 degrees out of phase with the electro-motive force of the signal direct, and which, consequently, prevents the signal from becoming substantially zero at any angle of the direction finder loop with respect to the line of signal. The effect of a mast has been found to be a maximum when the line between it and the direction finder is at right angles to the line of the signal, since when the direction finder loop is in a plane normal to the sending station such that a null point should be obtained, the plane of the loop is in line with the mast so as to cause the mast to produce the maximum amount of electro-motive force in it.

It has been found, in most cases where there are several masts, that the effect of each one individually upon the direction finder loop is approximately proportional to the cosine of the angle made by the loop with the line between the mast and the loop. The resultant effect of the masts collectively will, of course, depend upon the individual couplings of the various masts to the loop and will be an approximate cosine function of the azimuth angular relations of the same with the loop.

In order to obtain a well-defined null point when one or more masts, or equivalent grounded antenna structures, causing induced currents in a direction finder loop, are present, it is necessary to provide an electro-motive force in the loop which is equal and opposite to that induced by the masts and the like. One arrangement for accomplishing this result is to couple inductively a small vertical antenna to the loop circuit, and to vary this coupling with the orientation of the loop, as for example, by means of the character herein disclosed. The coupling will generally be loose.

There is still another method of compensating for the effects of grounded antenna structures in the vicinity of a direction finder loop, hereinafter sometimes referred to for convenience as mast effect, and that is to couple an auxiliary loop to the direction finder loop, the auxiliary loop being placed in such a plane as to be at right angles to the line of the mast effect. The auxiliary loop is coupled to the direction finder loop circuit in such a way as to produce an electro-motive force across the loop condenser which is 90 degrees out of phase with the electro-motive force produced across the condenser by the signal direct. The degree of coupling must be determined in each particular installation so as to be equal and opposite to the mast effect of the direction finder loop.

Applicant has knowledge of proposals heretofore made to compensate in radio direction finders or radio compasses for distortion of the wave front caused by the metallic mass of a ship or for effects of energy induced in the direction finder loop in phase with the signal energy from structures such as metallic struts, cables, etc., so arranged as to form closed circuits in which current can circulate as in a loop. One practical means for causing the pointer of a radio direction finder to indicate directly the true direction of a transmitting station, despite distortion of the front of the wave coming from the station by the metallic mass of a ship or structure giving rise to secondary, induced energy in phase with the signal, as referred to above, is shown in the application for United States Letters Patent of George H. Clark and George Y. Allen, Serial No. 453,855, filed March 19, 1921, Patent No. 1,828,395. Said application of Clark and Allen effects compensation for wave front distortion or in-phase, secondary, induced energy mechanically. Applicant is informed that it has also been proposed to accomplish such compensation by electrical means.

Although it has been found that energy induced in a direction finder loop from such structure as to cause the induced energy to be in phase with the energy directly induced in the loop by an incoming wave can be compensated for by means such as are disclosed in the above-mentioned application of Clark and Allen to cause the pointer of a direction finder at the null point to indicate directly the true direction of a transmitting station, the effects of energy induced in the direction finder loop from grounded masts or similar grouded structures, which instead of being in phase with the energy directly induced in the loop differs 90 degrees in phase therefrom, cannot be so compensated. The last-mentioned energy which is induced in the direction finder loop at a difference of 90 degrees in phase has its effect particularly in preventing a sharply-defined null point from being obtained in determining line of bearing, whereas the first-mentioned, secondary energy induced in phase with the directly-induced signal energy does not materially affect the sharpness of the null point.

So far as applicant is aware, none of the arrangements, whether mechanical or electrical, proposed for compensating for wave front distortion or the effects of in-phase, secondary, induced energy is intended to accomplish or can be employed to achieve the results of his invention, that is, the balancing out of energy which would otherwise obscure the null point or other point at which readings are taken in the operation of a radio direction finder. This is natural since the causes of wave front distortion do not give rise to null-point obscuring effects such as are obviated by aplicant's invention. On the other hand, the means provided by applicant's invention for balancing out energy induced from grounded masts, etc., which otherwise would obscure the null point, do not compensate for wave front distortion, or other effects which cause shifting rather than obscuring of the null point, so that applicant's invention is in no sense a functional equivalent of or substitute for the invention set forth in the above-described application of Clark and Allen. Applicant's invention is primarily concerned with the elimination of deleterious effects of signal energy, secondarily induced in a direction finder loop from grounded structure on a ship, such as masts, etc., in out-of-phase relation to the directly-induced signal energy. Such out-of-phase, secondarily-induced energy does not produce distortion of the wave front.

Applicant's invention is now being commercially used in direction finders in which is also incorporated apparatus embodying the Clark and Allen invention, the former to enable the obtainment of a clear and sharply-defined null point and the latter to cause the pointer of the direction finder to indicate at the null point the true direction of a transmitting station despite distortion of the wave front of the incoming wave or in-phase, secondarily-induced, signal energy.

An object of my invention is to provide a direction finder in which means is provided for enabling the obtainment of a sharply-defined null point. In the preferred embodiment of the invention, this means comprises devices inductively-coupled with the direction finder loop and arranged to balance out signal energy induced from masts, stacks, and other structures, acting as vertical antennæ on shipboard, at approximately 90 degrees difference in phase from the energy directly induced in the direction finder loop.

A further object of my invention is to impress an electro-motive force on a direction-finder loop to compensate at the angular position of the loop, employed in determining line of bearing, for disturbing electro-motive forces due to the environment of the loop.

Still a further object of my invention is to provide an improved radio direction finder which will be more efficient and reliable in operation than apparatus previously proposed for such use.

The novel features which I believe to be characteristic of my invention are set forth in the appended claims. The invention itself, however, both as to its organization and method of operation together with further objects and advantages thereof, will best be understood by reference to the following description when read in connection with the accompanying drawings wherein:

One means by which I accomplish the above-named purpose of eliminating the effects of grounded conductors in the vicinity of the direction finder loop, acting to spoil the null point, by producing an electro-motive force in the loop which is equal and opposite to that which is induced by a mast or other grounded structure or structures is to inductively couple a small, vertical antenna to the direction finder loop circuit and to vary this coupling with the orientation of the loop. It will be understood that only a small antenna is necessary, since although the pick-up of signal energy by a small, vertical antenna may be much less than by a grounded mast, the coupling of the small, vertical, compensating antenna with the loop, even though such parts are loosely-coupled electro-magnetically, is much closer than the coupling of the loop to the grounded mast.

It will be understood that the coupling between the vertical compensating antenna and the direction finder loop circuit must be varied with the orientation of the loop, because the degree of coupling between the grounded mast and the loop changes as the loop revolves about its axis.

Figures 1, 6:
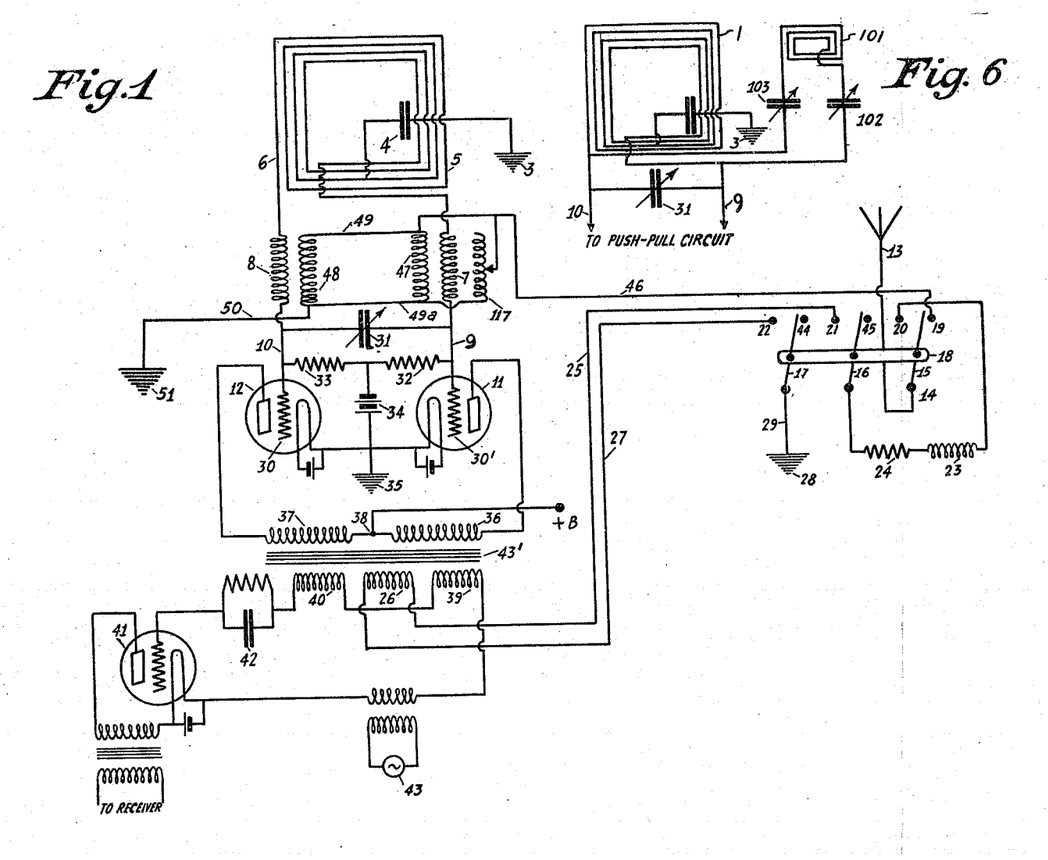
Fig. 1 is a schematic diagram of the circuit arrangement of one embodiment of my improved direction finder, including means for eliminating a mast effect to obtain a sharply-defined null point.
Fig. 6 shows means for compensating for disturbing effects on the direction finder loop by means of an auxiliary loop capacitively-coupled to the direction finder loop.

Making reference to the accompanying drawings, and first directing special attention to Fig. 1 showing the preferred form of circuit, I will describe the various features of my invention.

The direction finder loop 1 has its mid-point 2 grounded at 3 through a condenser 4. Coils 7 and 8 are connected to the leads 5 and 6 from the ends of the loop 1 for a purpose to be hereinafter described, and from the other terminals of coils 7 and 8 are connections 9 and 10 respectively to the grids 30′ and 30 respectively of two, three-electrode, vacuum tubes 11 and 12.

Located at a point adjacent to the loop 1, or at any convenient point, is an antenna 13 which will hereinafter be described as serving either of two purposes. The two purposes of the antenna 13 are (1) that of enabling sense of direction to be obtained, and (2) that of enabling the obtainment of a sharply-defined null point by balancing out electro-motive forces induced in the direction finder loop circuit from the neighboring, grounded structures.

I will first describe the function of the antenna 13 in conjunction with the loop 1 as means for determining the sense of direction of a transmitting station. Under this condition the loop 1 and antenna 13 operate in accordance with the principles enunciated in United States Letters Patent to Bellini and Tosi No. 948,086, granted February 1, 1910.

The antenna 13 is connected at 14 to one arm 15 of a three-pole, double-throw switch generally designated 18, and in order to determine the sense of direction by use of the cardioid curve of Bellini-Tosi the switch 18 is thrown to the left from the position shown in Fig. 1. Under such conditions the separate arms 15, 16, and 17 of the switch 18 rest over the contact points 20, 21 and 22 respectively. As shown, the contact 20 is connected with arm 16 through an inductance 23 and a resistance 24. The contacts 21 and 22 are connected through a conductor 25 leading from point 21 to a coupling coil 26 and a second conductor 27 leading from the coil 26 to the contact point 22. The arm 17 of the switch 18 is grounded in any preferred manner at 28.

Tracing the path of energy reaching the antenna 13, it is seen that it passes from the antenna 13 through the arm 15 of the switch 18 to contact 20, thence through the inductance 23 and resistance 24 to the switch arm 16, and thence from contact 21 through conductor 25, coupling coil 26, and conductor 27 back to the contact 22 from where it is grounded at 28 through switch arm 17 and conductor 29.

The incoming energy directly induced in the loop 1 is carried to the grid members 30 and 30′ of the tubes 11 and 12 respectively, which are preferably arranged in push-pull fashion. Connected across the conductors leading from the loop to the tubes 11 and 12 is a tuning condenser 31, and in parallel with the same are the usual grid leak resistances 32 and 33 having a common connecting point with the negative terminal of a bias battery 34. The corresponding filament terminals of the tubes are connected, and to their point of connection I connect the positive terminal of the bias battery 34. This connection is of the customary type with push-pull amplification, and forms per se no part of my invention. For purposes tending to ease of installation, efficiency, as well as other purposes which will readily suggest themselves to one skilled in the art, I have shown the output circuits of the tubes 11 and 12 completed through a ground return, and, therefore, there is zero potential at the point 35 of the filament connection to ground.

In the output circuits of the tubes 11 and 12 are primary coils 36 and 37 having the high potential source of anode current for each tube connected between them at 38. Coupled with the primary coils 36 and 37 are series-connected, secondary coils 39 and 40 in the input circuit of the detector tube 41 containing the customary grid leak and grid condenser arrangement 42. Also coupled to the secondary transformer coils 39 and 40 is the coil 26 adapted to transfer energy from the antenna 13 to the receiving system, which is indicated as of superheterodyne type including a local source 43 of high frequency energy.

I will now describe in more detail the action that takes place when the antenna 13 and loop 1 are together used to determine the sense of direction. Energy is received upon the loop 1, and its frequency characteristics are communicated through the one-way repeater comprising the tubes 11 and 12 whose output currents are impressed on the primary coils of the push-pull transformer, generally designated 43', by which the energy of said currents is transferred to the secondary coils 39 and 40 and directed to the detector 41. At the same time energy is being received upon antenna 13 and through the switching arrangement above described is carried to the coil 26 which is coupled to the transformer secondary coils 39 and 40. Due to the action of the tubes 11 and 12 as one-way repeaters preventing energy from passing from the transformer to the loop, energy transfer from the antenna 13 is solely to the input circuit of the detector tube 41. From the combined signal strength and its relative phase relationship, it is possible to determine sense of direction by rotation of the loop 1 through 180 degrees; all as explained in the above-mentioned patent to Bellini and Tosi.

As above stated, parasitic signals may affect the direction finder operation, and I have provided for eliminating their effect.

In considering the compensating action of the antenna 13 on the parasitic signals in the loop due to the grounded structures above noted, it is necessary to assume that the switch 18 has been moved to the right from the open position shown in Fig. 1 to a point where switch arms 17, 16, and 15 engage contacts 44, 45, and 19 respectively. In this position it is to be observed that contacts 44 and 45 are blank but that from contact 19 the energy received upon antennæ 13 is carried though a conductor 46, coils 47 and 48, connected in parallel by leads 49 and 49a, and conductor 50 to ground at 51.

The leads 5 and 6 from the loop 1 are carried down through a hollow spindle 52 (see Fig. 4), which carries the loop at its upper end, to the coils 7 and 8 to which are coupled the energy-transfer coupling coils 47 and 48 respectively. All of these coils may be of any preferred type, but I prefer that each of them be an arcuate-shaped, pancake type coil, Fig. 5. The signal currents from the antenna 13 flow through coils 47 and 48 and are maintained in the proper direction to obtain the proper phase relationship between secondary induced currents from grounded structures and the antenna 13 respectively, connections to the coils 47 and 48 being reversed with respect to the coils 7 and 8 associated with the loop antenna 1, when necessary to effect compensation, as will be explained below.

Figures 2, 3, 4, 5:
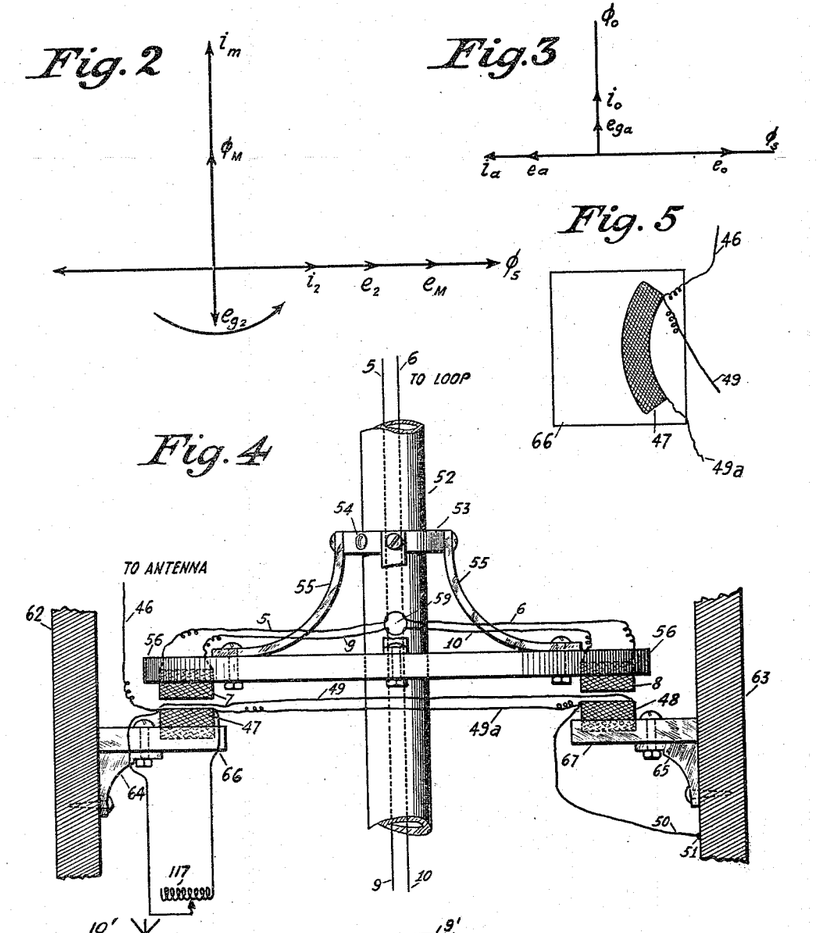
Figs. 2 and 3 are vector diagrams illustrative of the action of the apparatus in eliminating the mast effect.
Fig. 4 shows a preferred mechanical construction for mounting coils for automatically compensating for the mast effect.
Fig. 5 shows the form of coupling coils preferably employed in such compensation.

Upon the hollow spindle 52 which carries the direction finder loop 1 is mounted a slidable collar 53 which is secured to the spindle in any desired horizontal plane by means of a set screw 54, and carried by the collar 53, preferably at three or more points, are members 55 adapted to support a disk or ring 56 upon which the coils 7 and 8 are mounted.

The leads 5 and 6 from the loop 1 to the coils 7 and 8 are led out from the hollow spindle 52 through an opening 59 which is preferably located slightly below the slidable collar 53. For convenience in construction, I prefer to pass the wire 9 leading from coil 7 to condenser 31 and grid 30' of tube 11 back to the opening 59 in the spindle 52 and from there to said parts. The wire 10 connects the coil 8 with the condenser 31 and the grid 30 of the tube 12 through the same opening 59.

Mounted on supports 62 and 63 which are fixed and form a part of ship framework, aeroplane framework, or other framework, according to the usage to which the direction finder is put, are brackets 64 and 65, adapted to support and hold plates 66 and 67 respectively. The plate members 66 and 67 are so constructed as to extend outwardly from the supports 62 and 63 so as to bring the innermost edge portions considerably inside the periphery of the disk or ring member 56 and a small distance beneath the same which is regulated by adjustment of the collar 53. Upon the plate members 66 and 67 are mounted the coils 47 and 48 respectively which are connected by means of conductor 46 with the compensating antenna 13 (not shown in Fig. 4), and with any preferred ground 51 by means of conductor 50.

While the antenna coils 47 and 48 may be connected in series, I have found that better operation is obtainable by the parallel connection, herein employed, which affords greater electrical symmetry.

Conditions may arise under which a setting of the coils 47 and 48 for a particular direction does not give perfect compensation when obtaining a bearing in the same direction from a ship using a different type of transmitter. This discrepancy may be caused either by the transmitter alone or an actual difference in the wave front of the incoming signal. I have, therefore, in addition to the automatic balancing means previously described, provided a variable inductive shunt 117 placed about the coils 47 and 48. This inductive shunt may be placed on a panel of the receiver and serves as a vernier to make adjustments necessitated by conditions such as pointed out above. The adjustable inductance 117 is, of course, not needed when the compensating coils are arranged for manual rather than automatic adjustment.

Under certain conditions it may be found advantageous to vary the tightness of coupling between coils 47, 7 and 48, 8 respectively, and it is for this purpose that I have provided the collar 53 with the set screw 54 whereby different angular positions of the ring 56 relative to loop 1 may be obtained.

In an arrangement of the type herein disclosed, it is necessary that the coils 47, 48, 7 and 8 be of a peculiar shape, in order that the secondary, signal energy induced in the loop 1 from the antenna 13 will be equal to that induced in the loop from grounded structures, that is, by mast effect. It has been found that the mast effect as the loop is rotated follows a sine curve. It is, therefore, essential that the compensating effect also follow a sine curve in order to produce complete compensation. This desired result is produced by an arcuate shaping of the various "pancake" coils 47, 48, 7 and 8, and by arranging each of them with its concave surface on the side toward the loop spindle 52.

The hollow spindle 52 extends below the collar 53 and plates 66 and 67 and is rotatably mounted in any preferred or suitable manner. An indicator of any preferred form may be operatively connected with the spindle whereby the angular position of the spindle may be read from the position of the indicator with respect to a compass card. Above the collar 53 at a point beneath the loop, there is preferably provided a bearing or collar in which the spindle is adapted to turn and which will at the same time provide a support.

There is an induced signal voltage in the antenna 13 due to the signal flux which is in phase with the latter, and the current in the antenna 13 due to the voltage is either 90 degrees ahead of or 90 degrees behind said voltage because the antenna may be considered either as capacitive or inductive depending upon whether the coils 47 and 48 are of such values as to tune the antenna 13 below or above the signal wave length, and for the purpose of clarity of explanation the resistance may be neglected since it is relatively small.

The current in the antenna 13 produces in the coils 47 and 48 a flux which cuts the coils 7 and 8 respectively and induces a voltage in the direction finder loop circuit which leads or lags this flux by 90° depending upon which of the terminals of coils 47 and 48 are connected with the antenna conductor 46 and ground conductor 50. This induced voltage sets up a current which is in phase with the voltage due to the fact that the direction finder loop circuit is tuned to the frequency of the induced voltage, and the flow of current in the loop circuit produces a voltage on the grid of the first detector tube 41 of the receiver which lags behind the current in the loop by 90°. From the effects of signal flux in grounded masts, etc., as vectorially illustrated in Fig. 2, it will be seen that the voltage produced on the grid of the detector tube 41 by antenna 13 is either in phase or 180° out of phase with the voltage that it is desired to balance out, namely, that due to the grounded mast effect. If necessary to obtain a compensating voltage 180° out of phase with but equal to the interfering voltage due to the mast effect, the connection of the coils 47 and 48 with respect to the coils 7 and 8 of the loop circuit are reversed and a 180° phase shift thus effected. Of course, this reversal of the connections to the coils 47 and 48 or coils 7 and 8, as the case may be, need be made but once for any particular installation and is not required to be made in ordinary operation.

Referring to Figs. 2 and 3 of the drawings, the above-stated conditions are analyzed vectorially, and the relationships between currents, voltages, and fluxes are readily ascertained when this figure is read in connection with Fig. 1 and the description accompanying the same. The various currents are indicated by $i$ with appropriate sub-letters, the voltages by $e$ with appropriate sub-letters, and the fluxes by the symbol $\phi$ with appropriate sub-letters. In Fig. 2, $\phi_s$ represents the signal flux and $e_m$ the voltage produced in a grounded mast or like, simple or compound grounded structure, by the signal flux $\phi_s$, $e_m$ being in phase with $\phi_s$. The voltage $e_m$ produces a current $i_m$ in the grounded mast which in all practical cases has a predominating capacitive reactance causing the current $i_m$ to lead $\phi_s$ in phase by 90 degrees. The current $i_m$ produces flux $\phi_m$ in phase with $i_m$, and the flux $\phi_m$ induces directly in the direction finder loop a voltage $e_2$ lagging $\phi_m$ by 90 degrees and producing a current $i_2$ in phase with voltage $e_2$. The current $i_2$ gives rise to a voltage $e_{g2}$ across the direction finder loop which lags 90 degrees behind current $i_2$.

In Fig. 3, $e_o$ represents the voltage induced in the small, vertical antenna 13 due to and in phase with the signal flux $\phi_s$, and $i_o$ is the current in the small antenna due to and leading $e_o$ by 90 degrees, since the antenna 13 has a predominating capacitive reactance. $\phi_o$ denotes the flux in coils 47 and 48 due to the current $i_o$ in the small antenna, and $e_a$ the voltage in the direction finder loop due to the flux $\phi_o$. The voltage $e_a$ is either 90 degrees behind or ahead of $\phi_o$ depending upon the relative directions of winding of the coils 47, 7 and 48, 8 respectively, $e_a$ in Fig. 3 being taken as leading $\phi_o$ by 90 degrees. $i_a$ represents the current in the loop due to and in phase with the voltage $e_a$, and $e_{ga}$ the voltage across the condenser of the loop, i. e., detector grid voltage, which arises from and lags 90 degrees behind current $i_a$.

Upon rotating the loop 1 about its axis, the voltage due to the signal direct and the voltage $e_{g2}$ representing the voltage due to the mast effect increase and diminish in amplitude but are always 90 degrees out of phase in time. The voltage $e_{g2}$ may be compensated for by means of the untuned auxiliary antenna system 13 coupled in the manner shown in Fig. 1 in which case a voltage $e_{ga}$ is impressed on the grid of the first detector tube 41 which is equal to the voltage $e_{g2}$ due to the mast effect as well as 180 degrees out of phase therewith.

The balancing out circuit including the vertical antenna 13 should be either capacitive or inductive respectively to all frequencies designed to be received by the direction finder. In the case assumed the reactance of this balancing out circuit is capacitive, but it has been demonstrated commercially that the reactance may also be inductive, if desired.

In the embodiment of the invention shown in Fig. 6, there is provided an auxiliary loop structure of the type heretofore mentioned as a means for compensating for mast effect. In this figure, the direction finder loop 1, together with the midpoint lead to ground at 3, the leads 5 and 6 to the loop tuning condenser 31, and the leads 9 and 10 to the three-electrode tubes 11 and 12 are the same as shown in Fig. 1. Capacitively coupled with loop 1 by means of condensers 102 and 103 is a compensating loop 101, which is untuned, as is antenna 13 in Fig. 1, so far as the signal is concerned.

The condensers 102 and 103 are preferably connected by a uni-control means, such as is well known in the art, for the purpose of enabling the same to be operated in unison to maintain symmetry between the opposite halves of the loop 1. To attain such symmetry, I prefer to connect the loop 101 with loop 1 by means of the said two condensers instead of a single condenser as might readily be employed for coupling purposes.

The auxiliary loop 101 is mounted in fixed position and is preferably arranged substantially at right angles to the line of the mast effect, it is seen that when a signal is in line with the mast effect both loops in determination of line of bearing by null-point, are at right angles to the signal and the mast induction. Therefore, there is no compensation and no mast effect, and the null point on the direction finder is sharply defined. However, when the signal is at right angles to the line of the mast effect, the mast effect is a maximum on the direction finder loop, but it is still maintained substantially zero on the auxiliary loop, whereas, the pick up by the auxiliary loop from the signal is a maximum and, therefore, maximum compensation is provided. It is thus seen that automatically after the compensation has been properly determined for the producing of maximum effect, it is maintained at its proper value.

As is the case in the use of the compensating antenna 13, the loop 101 induces in the loop circuit 1 an electro-motive force which is 90 degrees out of phase with respect to the voltage induced in the loop circuit 1 by means of the signal direct, and by proper coupling the induced voltage from the loop 101 may be brought 180 degrees out of phase with respect to the disturbing voltage in loop circuit 1 due to the external causes previously set forth.

It is, however, to be understood that the additional loop 101 is not designed to aid in determining sense of direction but only in obtaining an accurate line of bearing.

The present embodiment of my invention provides means which in many commercial installations has been found to be very effective in enabling the attainment of a sharply-defined and accurate null point.

It has also been found that after line of bearing has been accurately determined by the use of the invention, the operator may turn the loop 1 to a position exactly at right angles to that at which the null point was obtained and may then by manipulation of the switch 18 and rotation of the loop through 180 degrees accurately determine sense of direction of the sending station, in accordance with the principles of United States Letters Patent to Bellini & Tosi, No. 948,086.

Although the antenna 13 or auxiliary loop 101, as the case may be, has been hereinbefore described as being employed to compensate for the effect of masts, grounded stays, etc. in obtaining an improved null point, it should be understood that this presupposes that, in accordance with customary practice, the null point rather than the point of maximum signal is to be used in determining line of bearing and is not intended to limit the invention to use of null point in contradistinction to that of maximum signal.

Experience has shown that under some conditions more satisfactory compensation for mast effects to obtain a more sharply defined null point can be obtained by manually-regulable means than by the automatic compensating means hereinbefore described. Where it is desired to employ manually-controlled compensating means, the coils 47, 7 and 48, 8 and the parts associated with them in Fig. 4 of the drawings may be omitted and the device illustrated in Fig. 7 employed in place thereof.

Figure 7:
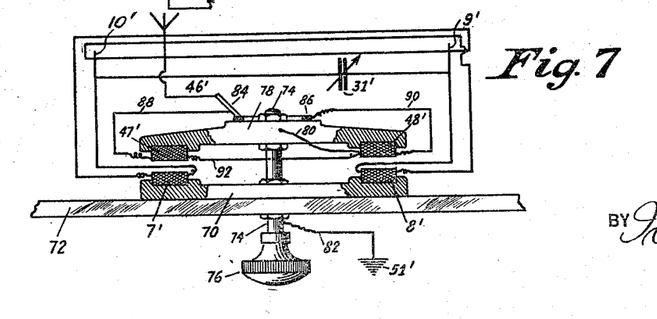
Fig. 7 shows a manually-operable compensating arrangement.

In Fig. 7, coils 7' and 8' corresponding respectively with the coils 7 and 8 of Fig. 4 are mounted on a supporting member 70 fixed to a panel 72 of the receiver with which the direction finder loop is associated, and journalled in the member 70 and the panel 72 is a spindle 74 provided on its outer end with an adjusting knob 76 and on its inner end with a disk-shaped or otherwise suitably formed member 78 arranged to support coils 47' and 48' for movement adjacent to the coils 7' and 8'. Coils 47' and 48' correspond respectively with coils 47 and 48 of Fig. 4. Coils 7', 8', 47' and 48' of Fig. 7 are arcuate-shaped, "pancake" coils of like form to the coil 47 illustrated in Fig. 5 of the drawings. Accordingly, it will be understood that the arrangement of coils 47' and 48' in Fig. 7 relative to coils 7' and 8' is like that of coils 47 and 48 relative to coils 7 and 8 in Fig. 4, it being noted, however, that coils 47' and 48' are mounted for movement relative to stationary coils 7' and 8', whereas the reverse arrangement is shown in Fig. 4. It will be plain, however, that it is immaterial whether the coils 47' and 48' are moved relatively to coils 7' and 8' or the last-mentioned coils moved relatively to coils 47' and 48'.

In Fig. 7, the coils 7' and 8' are connected to the loop 1', leads 10' and 9' respectively and to tuning condenser 31' in a manner analogous to the connections of the coils 7 and 8 in Figs. 1 and 4, and the coils 47' and 48' are connected to antenna 46' and ground 51' through lead 80, spindle 74 and lead 82 in a manner analogous to the connections of the coils 47 and 48 in Figs. 1 and 4. Connection between the antenna 46' and coils 47' and 48' in Fig. 7 is made through a brush 84, ring 86 and parallel leads 88 and 90, the path from the antenna conductor 46' to ground 51' being through lead 88, coil 47' and lead 92 in parallel with lead 90 and coil 48' and thence through lead 80, spindle 74 and lead 82.

In operating the device shown in Fig. 7, the general procedure is to first set the knob 76 at zero, no voltage being then induced by the antenna 13 into the loop circuit. The loop is then turned to give a minimum signal, the residual signal being largely due to the so-called mast effect. The knob 76 is then turned until the maximum compensation for mast effect is obtained. The residual signal then remaining is due to the fact that the loop is not in the position of exact bearing, which is now procured by a further adjustment of the loop for zero signal. Some experience will enable the adjustments to be made as described without repetition of them, which in the case of one not familiar with the operation may be necessary.

The variation of the coupling by manipulation of knob 76 may be facilitated by supplying a scale (not shown) marked from zero to 360 degrees corresponding to the loop compass card, the scale being hand-calibrated in the field so that if the bearing is taken, for example, at 20 degrees, the setting of the knob at the point marked 20 will afford the correct compensation.

Having fully described the invention what is claimed is:

1. In apparatus of the character described, a closed receiving circuit including an energy absorption member, means for tuning said circuit to a desired signal frequency, coupling coils connected to each terminal of said absorption member and in series with said circuit, said coupling coils being symmetrical, an auxiliary absorption member, coupling coils connected therewith for supplying additional energy to said closed circuit through said first named coupling coils, and means to control the phase and amplitude of the additional energy to neutralize in said circuit the current due to mast effect.

2. In an apparatus of the character described, a loop circuit, a receiving circuit coupled therewith, an antenna circuit, and means for alternatively introducing energy from said antenna circuit into said loop circuit or into said receiving circuit independently of the loop.

3. In an apparatus of the character described, a tuned circuit, a receiving circuit, a repeater for transferring energy from said tuned circuit to said receiving circuit, a circuit detuned with respect to the signal frequency, means for coupling said detuned circuit to said tuned circuit, means for coupling said detuned circuit to said receiving circuit, and switching means for alternatively connecting said detuned circuit to said tuned circuit coupling and said receiving circuit coupling.

4. In an apparatus of the character described, a signal resonant loop circuit, a plurality of thermionic tubes in push pull arrangement having their control electrodes connected through inductances with the terminals of said loop circuit, a receiving circuit, means for transferring energy from said tubes to said receiving circuit, a non-resonant antenna circuit, and means including said inductances for transferring energy from said antenna circuit to said loop circuit, said transferred energy being adapted to produce in said tuned circuit an electromotive force of a value and phase adapted to neutralize parasitic effects introduced in said tuned circuit from external sources.

5. In an apparatus of the character described, a tuned loop circuit, an amplifier connected with said loop, and a detector circuit coupled to said amplifier, detuned antenna circuit, and switching means adapted in one position to connect said antenna with said loop in a manner to compensate for disturbing electromotive forces induced in said loop from external sources, and in a second position to connect said antenna with said detector circuit in a manner to prevent energy passing into said loop circuit.

6. In an apparatus of the character described, a directional tuned circuit adapted to pick up signal energy, a thermionic tube connected to each terminal of said tuned circuit, said tubes being arranged in push-pull manner, a primary transformer winding adapted to receive the combined output energy of said tubes, a secondary transformer winding, a detector circuit connected with said secondary winding, an open aerial circuit detuned with respect to the signal frequency, and means for coupling said aerial circuit with said transformer secondary winding, said coupling being adapted to feed energy from said antenna to said detector circuit and said tubes being adapted to block said aerial circuit energy from said loop circuit, whereby an accurate determination of sense of direction is obtained.

7. In an apparatus of the character described, a directional loop circuit, an amplifier arranged push-pull fashion, a connection between said loop and the input terminals of said amplifier, a transformer adapted to receive the output energy of said amplifier in its primary windings, a detector circuit connected to the secondary winding of said transformer, an antenna circuit detuned with respect to signal frequency, means for coupling said antenna to said transformer, said coupling being adapted to supply energy from said antenna to said detector circuit through said transformer, and means comprising said amplifier for blocking said antenna energy from said loop circuit.

8. In an apparatus of the character described, a directional tuned circuit, a detector circuit, means for transferring energy from said tuned circuit to said detector circuit, a non-resonant antenna, means for coupling said antenna to said transfer means, and means positioned between said tuned circuit and said energy transfer means for blocking said antenna energy from said tuned circuit and amplifying the energy passing from said tuned circuit to said transfer means.

9. In an apparatus of the character described, a loop, a hollow spindle for carrying said loop, a disk member carried by said spindle, coupling coils associated with said loop adapted to be carried by said disk, a plurality of supports beneath said disk, a coil carried by each of said supports, said last named coils being inductively coupled with said loop coils, and means for connecting said last named coils with an antenna circuit, whereby an electro-motive force is induced in said loop of a value adapted to neutralize the effect of parasitic currents in said loop due to external causes.

10. The apparatus claimed in claim 9 wherein all of said coils are arcuate-shaped.

11. The method of determining the line of bearing of a transmitting station by means of a loop which includes introducing into said loop an electro-motive force substantially equal to and 180 degrees out of phase with respect to voltage induced in said loop from adjacent grounded structure, whereby a sharply defined null point is produced.

12. In an apparatus of the character described, a closed energy absorption circuit, a push-pull amplifying system for amplifying the energy picked up at said absorption circuit, a receiver coupled to the output circuit of said push-pull amplifier, an untuned balancing circuit for balancing out currents induced in said absorption circuit due to mast effect, and means for symmetrically coupling said untuned circuit with the said energy absorption circuit.

13. In an apparatus of the character described, a closed circuit for receiving signal energy, a receiver circuit, a push-pull connected amplifying device for transferring energy from said closed circuit to said receiver circuit and amplifying the said transferred energy, an untuned absorption circuit, and means for coupling said untuned absorption circuit symmetrically to the input side of each of the push-pull amplifiers for introducing into said amplifiers an electro-motive force of a proper phase to compensate for induced electromotive forces in said closed circuit due to mast effects.

14. In a system for determining line of bearing and sense of direction, a rotatable receiving loop, a common receiver, means for transferring energy from said loop to said receiver, a detuned antenna circuit, means for introducing energy from said antenna circuit into said loop circuit for compensating for mast effects induced in said loop circuit to obtain the true line of bearing, means for introducing the energy from said detuned antenna circuit directly into said receiver for obtaining a sharply defined sense of direction, and means for blocking the energy directly introduced into said receiver from said loop circuit.

15. In a direction finding system, a tuned loop circuit, a receiving circuit, a plurality of one-way repeaters for transferring energy from said loop circuit to said receiver circuit, a detuned antenna circuit for compensating for errors introduced into said loop circuit, and means for alternatively connecting the said detuned antenna circuit with said loop circuit for compensating for mast effects obscuring the null point in obtaining line of bearing and with said receiver circuit directly and independently of said loop circuit for obtaining sense of direction.

16. In a direction finding system, a tuned loop circuit for receiving signal energy, a receiving circuit associated with said loop circuit and push-pull connected one-way repeaters for transferring energy received upon said loop circuit to said receiving circuit, a detuned antenna circuit, coupling coils for coupling said detuned antenna circuit with said loop circuit and introducing into said loop circuit an electro-motive force 180° out-of-phase with respect to electro-motive forces introduced into said loop circuit from external disturbing mast effects, and a variable inductive shunt associated with said coupling for providing additional compensation effect upon said loop circuit.

17. In a direction finding system, a closed loop circuit for receiving signal energy, a receiver associated with said loop and push-pull connected vacuum tubes having their input circuit connected with said loop circuit and their output circuit connected with said receiving circuit, a detuned antenna circuit, coupling coils associated with each side of said loop circuit for coupling said detuned antenna circuit to said loop circuit to introduce into the said loop an electro-motive force of a phase suitable to compensate for mast effect, a coupling coil associated with said antenna circuit for directly connecting said antenna with said receiving circuit, switching means associated with said untuned antenna circuit for alternatively switching the said antenna connection from said first to said second named coupling coils for obtaining a true line of bearing and obtaining a true sense of direction respectively, and means provided by said vacuum tubes connecting said loop circuit with said receiving circuit for blocking the energy directly introduced into said receiver from said untuned antenna while obtaining the sense of direction from said loop.

18. In a directional receiver, the combination of a frame aerial, a receiving circuit, a thermionic amplifier interposed between said frame aerial and said receiving circuit, a vertical aerial, and means for alternatively introducing energy from said vertical aerial into the input circuit or the output circuit of said thermionic amplifier.

19. In a directional receiver, the combination of a frame aerial, a receiving circuit, a thermionic amplifier interposed between said frame aerial and said receiving circuit, a vertical aerial, means for alternatively introducing energy from said vertical aerial into the input circuit or the output circuit of said thermionic amplifier, and means for preventing said energy from entering said loop circuit when it is introduced into the output circuit of said thermionic amplifier.

20. In a directional aerial system a loop antenna, a receiving circuit, a push pull amplifier interposed between said loop aerial and said receiving circuit, a vertical aerial circuit and means for alternately introducing energy from said vertical aerial circuit into the input circuit of said push pull amplifier or into the input circuit of said receiver.

21. The method of determining the direction of a source of radiant energy by means of a loop circuit inherently subject to pointing errors due to the mast effects of adjacent conducting structures which transfer current to said loop circuit and by means of a non-resonant open aerial circuit which includes the steps of setting up in said closed circuit current oscillations at signal frequency, producing current oscillations in said non-resonant aerial circuit 90° out of phase with respect to the current oscillations at signal frequency, introducing current oscillations from said non-resonant aerial circuit to said loop aerial circuit, and producing indications with the resultant current flowing in said loop aerial circuit.

22. In a radio direction finder system, a directional antenna comprising one or more turns of wire, an inductance in series with each terminal of said antenna, means for connecting the electrical midpoint of said antenna to ground, an open antenna path, inductances in said open antenna path, and means for coupling said last named inductances to said first named inductances.

23. In a selective signalling system, a closed absorption circuit, means for connecting the electrical midpoint of said closed absorption circuit to ground, a plurality of inductances connected to said closed absorption circuit, a nonresonant open antenna path, a plurality of inductances mounted adjacent said first named inductances, and a connection between said last named inductances and said nonresonant antenna path.

24. In compensating means to be used with a loop circuit, a non-resonant vertical antenna, a pair of inductances connected with said loop circuit, a second pair of inductances located adjacent said first named pair of inductances, means for supplying energy from said non-directional aerial to said second named pair of inductances and means for producing relative movement between said pairs of inductances.

25. In compensating mechanism to be used with a rotatable frame aerial, a non-directional aerial, an inductance in said frame aerial, a second inductance mounted adjacent said first named inductance, means for connecting said second named inductance to said vertical aerial, means for rotating said frame aerial, and means for simultaneously producing relative movement between said inductances.

26. A radio receiving system including a rotatable frame aerial comprising one or more turns of conducting material, said frame aerial absorbing energy from a natural medium, a connection between the electrical center of said aerial and ground, a tuning capacity connected in series with said aerial, an inductance connected in series with said aerial and said capacity, and means for introducing additional energy into said aerial comprising a vertical antenna, an inductance therein coupled to said first named inductance, and means for varying the amplitude and phase of the additional energy introduced in said frame aerial comprising an adjustable impedance connected with said vertical aerial.

27. A directional receiver comprising a multiple turn loop aerial mounted for rotation, said loop aerial being responsive to radiant energy, means for balancing said loop aerial with respect to ground comprising, a connection between the electrical center of said loop aerial and ground, a variable capacity and an inductance connected in series with said loop aerial to form a closed tuned circuit, a vertical aerial, an inductance in series therewith, said last named inductance being coupled to said first named inductance, a thermionic amplifier having input electrodes and output electrodes, a divided impedance, means for impressing energy from said loop aerial circuit upon said impedance, a connection between two points on said impedance and the input electrodes of said thermionic amplifier, and a connection between a third point on said impedance and ground.

28. Receiving means comprising, a multiple turn rotatable frame aerial, a connection between the electrical center thereof and ground, an inductance connected with each terminal of said frame aerial, a tuning capacity connected in series with said inductances and with said frame aerial, a pair of thermionic tubes having their input electrodes connected to the terminals of said capacity, a pair of resistances connected in series across the terminals of said capacity, means for connecting a point on said resistances to the filaments of said tubes, said last named means including a biasing battery, and means for compensating out of phase energy inherently present in said loop aerial due to any adjacent conductive structures including a vertical aerial, inductive means in series therewith, and means for coupling said inductive means to said inductances in series with said frame aerial.

29. A directional receiver comprising a multiple turn rotatable frame aerial, a connection between a point on said frame aerial and ground, an inductance connected in series with each terminal of said frame aerial, a variable capacity connected in series with said inductances and with said frame aerial to form a closed tuned circuit, a pair of thermionic tubes, a connection between the control electrode of each of said tubes and a terminal of said frame aerial, a resistance connected to each of said control electrodes, a source of potential connecting the free end of each of said resistances to the filaments of said tubes, a non-directional aerial, an inductance in series therewith, said inductance being coupled to the inductances in series with said frame aerial to introduce energy from said non-directional aerial into said frame aerial and series inductances, and means for adjusting the phase and amplitude of the energy introduced from said non-directional aerial into said frame aerial and series inductances comprising a second inductance in said non-directional aerial, said last named inductance being adjustable, and means associated with the output electrodes of said thermionic tubes for utilizing the energy relayed therein.

FRED HUTTON KROGER.